(12) United States Patent
Schanz et al.

(10) Patent No.: US 8,057,677 B2
(45) Date of Patent: Nov. 15, 2011

(54) EXTRACTION METHOD USING A STATIC MICROMIXER

(75) Inventors: Gerhard Schanz, Darmstadt (DE); Gerhard Sendelbach, Darmstadt (DE)

(73) Assignee: Wella GmbH, Schwalbach (DE)

( * ) Notice: Subject to any disclaimer, the term of this patent is extended or adjusted under 35 U.S.C. 154(b) by 973 days.

(21) Appl. No.: 10/563,354

(22) PCT Filed: Jun. 4, 2004

(86) PCT No.: PCT/EP2004/006043
§ 371 (c)(1),
(2), (4) Date: May 18, 2006

(87) PCT Pub. No.: WO2005/018772
PCT Pub. Date: Mar. 3, 2005

(65) Prior Publication Data
US 2007/0007204 A1    Jan. 11, 2007

(30) Foreign Application Priority Data
Jul. 25, 2003    (DE) .................................. 103 33 921

(51) Int. Cl.
*B01D 11/00*    (2006.01)
*B01F 5/06*    (2006.01)
*C02F 1/26*    (2006.01)
*B01F 13/00*    (2006.01)

(52) U.S. Cl. ......... 210/634; 366/336; 366/340; 366/341

(58) Field of Classification Search ................... 210/634; 366/336, 340
See application file for complete search history.

(56) References Cited

U.S. PATENT DOCUMENTS
4,560,284 A  * 12/1985  Chen ............................ 366/336
(Continued)

FOREIGN PATENT DOCUMENTS
DE    199 61 257    7/2001
(Continued)

OTHER PUBLICATIONS
Hemming, W.: Verfahrenstechnik, 2., ueberarb. u. erg. Aufl.. Wuerzburg: Vogel-Verlag, 1980, S. 158, 159. ISBN 3-8023-0084-X. (With Certified English Translation).

*Primary Examiner* — Vickie Kim
*Assistant Examiner* — Katherine Zalasky
(74) *Attorney, Agent, or Firm* — Michael J. Striker

(57) ABSTRACT

A process is described for the extraction of one or more substances from a fluid starting material with an appropriate extraction agent by use of a static micromixer for mixing the starting material with the extraction agent. The static micromixer is provided with disk-shaped components, the disk (1) being provided with at least one inlet opening (2) for introducing at least one fluid stream into a linking channel (3) disposed in the plane of the disk and at least one outlet opening (4) for removing the fluid stream into a mixing zone (5) disposed in the plane of the disk, the inlet opening (2) being connected with the outlet opening (4) in a communicating manner through a linking channel (3) disposed in the plane of the disk, and the linking channel (3) before opening into the mixing zone (5) being divided by microstructure units (6) into two or more part channels (7), and the widths of the part channels being in the millimeter to submillimeter range and being smaller than the width of the mixing zone (5).

23 Claims, 9 Drawing Sheets

U.S. PATENT DOCUMENTS

Figure 1A:
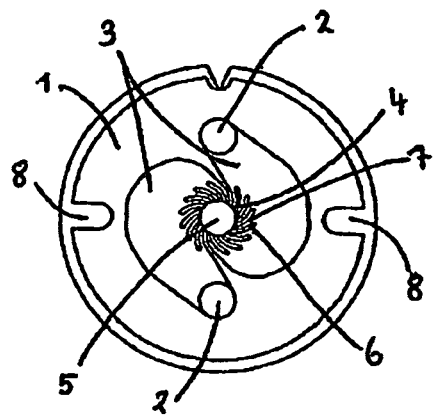

| Patent Number | | Date | Inventor |
|---|---|---|---|
| 5,803,600 | A | 9/1998 | Schubert et al. |
| 6,082,891 | A * | 7/2000 | Schubert et al. ............... 366/338 |
| 6,299,657 | B1 | 10/2001 | Schubert et al. |
| 6,321,998 | B1 | 11/2001 | Schubert et al. |
| 6,802,640 | B2 | 10/2004 | Schubert et al. |
| 6,851,846 | B2 | 2/2005 | Fujii et al. |
| 6,935,768 | B2 | 8/2005 | Loewe et al. |
| 2002/0187090 | A1 | 12/2002 | Vanden Bussche et al. |
| 2003/0039169 | A1 | 2/2003 | Ehrfeld et al. |
| 2004/0027915 | A1 | 2/2004 | Lowe et al. |
| 2004/0125689 | A1 | 7/2004 | Ehrfeld et al. |
| 2004/0130967 | A1 * | 7/2004 | Wolf et al. .................... 366/340 |

FOREIGN PATENT DOCUMENTS

| | | |
|---|---|---|
| DE | 202 06 371 | 8/2002 |
| DE | 100 41 823 | 3/2003 |
| DE | 199 27 556 | 5/2003 |
| JP | 2003001077 | 1/2003 |
| WO | 95/30475 | 11/1995 |
| WO | 97/16239 | 5/1997 |
| WO | 97/17130 | 5/1997 |
| WO | 97/17133 | 5/1997 |
| WO | 00/78438 | 12/2000 |
| WO | 02/16017 | 2/2002 |
| WO | 02/089962 | 11/2002 |

* cited by examiner

EXTRACTION METHOD USING A STATIC MICROMIXER

CROSS-REFERENCE TO RELATED APPLICATIONS:

This is the U.S. National Stage of PCT/EP04/006043, filed on 04 Jun. 2004, and claims priority under 35 U.S.C. 119(a)-(d) to German Patent Application No. DE 103 33 921.3, filed 25 Jul. 2003.

BACKGROUND OF THE INVENTION

Field Of The Invention

The subject matter of the invention is a process for the extraction of one or more substances from a fluid starting material with an appropriate extraction agent by use of a static micromixer whereby the starting material is mixed with the extraction agent.

In extraction, a solvent (extraction agent) is used to separate one or more constituents from a mixture of substances. Fluid mixtures of substances can be liquid or gaseous. By extraction is generally meant the enrichment or isolation of substances from liquid mixtures by means of a selectively acting immiscible solvent. With the aid of suitable solvents, however, substances can also be extracted from gaseous mixtures.

Extraction processes are useful, in particular, when thermal processes such as distillation are unsuitable. Extraction processes can be used, for example, for the separation of systems having similar boiling points, for example to extract aromatic substances from hydrocarbons, for example mineral oil fractions; to separate high-boiling substances from aqueous systems (for example, phenols); to separate heat-sensitive substances, for example biologically or biotechnologically obtained substances (for example, antibiotics from fermentation solutions); to separate azeotropic mixtures; to extract organic materials from salt solutions; to extract salts from polymer solutions; to extract metal salts from minerals for the purpose of obtaining metals or to extract metals from wastewater for the purpose of wastewater purification, for example to extract copper, nickel and cobalt from aqueous salt solutions with hydroxyoximes dissolved in kerosene; to work up nuclear fuels, for example to extract salts of uranium, plutonium and thorium with tributyl phosphate; or generally as a purification operation in chemical processing technology.

Fluid extraction is based on the equilibrium of distribution of the substances to be extracted between two immiscible fluid phases. One of the constituents to be extracted (extractive substance) is dissolved or dispersed in a fluid carrier medium. A solvent not miscible with the carrier medium (extraction agent) usually has as high a selectivity for the extractive substance as possible. The carrier medium and the extraction agent are brought into contact with one another, and in the ideal case a distribution equilibrium for the distribution of the extractive substance between the carrier medium and the extractant is established. After phase separation, the raffinate formed is enriched in the extractive substance. A single equilibrium step is often not sufficient for the desired enrichment, because the equilibration was not complete or the selectivity was not sufficient. In this case, several consecutive separation steps can be used. To maximize the efficiency of material exchange between the immiscible fluid phases, it is necessary to create as large a phase boundary as possible. To this end, in the extraction apparatus one of the two phases is usually divided into drops, namely a mixture of a disperse phase in a continuous phase is formed. Which of these two phases is dispersed depends on several factors, for example on the properties of the substances, the quantities of the phases or the design of the extraction apparatus. In general, the phase that gives a larger surface, in most cases the phase with the higher flow rate, is dispersed. Phase separation is difficult especially when phases with a high interfacial tension are used. A high interfacial tension, on the other hand, is desirable if the formation of difficultly demixable emulsions is to be prevented.

BRIEF SUMMARY OF THE INVENTION

The present invention improves extraction processes, particularly in terms of an efficient mixing of the carrier medium with the extraction agent.

We have now found that the use of static micromixers is particularly well suited for mixing the carrier medium with the extraction agent in extraction processes. The object of the invention therefore is a process for carrying out extractions whereby at least two immiscible fluid phases are mixed with one another, and at least one of the phases contains a substance that is extractable with the other phase, and whereby the mixing is carried out by use of at least one static micromixer provided with at least one component in the form of a disk and whereby the disk has at least one inlet opening for the introduction of at least one fluid stream into a linking channel disposed in the plane of the disk and at least one outlet opening for the outflow of the fluid stream into a mixing zone disposed in the plane of the disk, whereby the inlet opening is connected with the outlet openings through a linking channel disposed in the plane of the disk in a communicating manner and whereby the linking channel before opening into the mixing zone is divided by micro-structure units into two or more part channels, the widths of the part channels being in the millimeter to submillimeter range and being smaller than the width of the mixing zone.

The advantages of the use of static micromixers consist of the possibility of reducing the size of the extractor and thus of integration into other systems. Rapid and intensive mixing is made possible at relatively low pressure losses, in a small mounting space and with simple fabrication of the required components. The micromixers can be integrated with a settler in a mixer/settler unit, but a settler can also be installed separately. By the cooperation and the consecutive in-stallation of two or more integrated or separate mixer/settler units in a mixer/settler battery in a narrow space, further possibilities are created for process optimization, particularly in terms of achieving the desired degree of enrichment or depletion. The efficient formation of large boun-dary surfaces achievable with the static micromixers according to the invention, particularly also in the mixing of fluids with a high interfacial tension, promotes the establishment of the distri-bution equilibrium. Mixing times between 1 second and a few milliseconds can be achieved.

One class of known micromixers is based on diffusion-controlled mixing processes. To this end, adjacent fluid lamellae with a thickness in the micrometer range are alternately formed. By appropriate selection of the geometry, the width of the fluid lamellae and thus of the diffusion paths can be set. Such static micromixers are described, for example, in DE 199 27 556 A1, DE 202 06 371 U1 and WO 02/089962. The drawback of micromixers based on diffusion be-tween microscopic fluid lamellae is that a relatively low flow rate for creating and maintaining la-minar flow conditions is required. This mixing principle allows only relatively low throughputs.

Also known are micromixers consisting of guiding components provided with pass-through channels or with sheets provided with grooves which when superposed on one another form a number of channels for the various fluids to be mixed with each other, the dimensions of the channels being in the micrometer range. The fluid streams emerge as adjacent fluid lamellae from the channels into a mixing space where mixing occurs by diffusion and/or turbulence (see in particular WO 97/17130 and the literature cited therein, as well as WO 97/17133, WO 95/30475, WO 97/16239 and WO 97/78438). The fabrication of these components is relatively expensive and complicated, and the passing of the fluids to be mixed through a multiplicity of long and very narrow channels can cause relatively high pressure losses. When high through-puts are needed, this may require the use of powerful pumping systems.

By the term "fluid" is meant a gaseous or liquid substance or a mixture of such substances that contains one or more dissolved or dispersed solid, liquid or gaseous substances.

The term "part channels" also includes division of the fluid stream into part streams by built-in microstructure parts just before the outflow of said feed stream into the mixing zone. The dimensions, particularly the lengths and widths of these built-in parts, can be in the range of millimeters or preferably smaller than 1 mm. The part channels are preferably shortened to the length that is absolutely needed for flow control and, hence, for a certain throughput they require comparatively low pressures. The length-to-width ratio of the part channels is preferably in the range from 1:1 to 20:1, particularly from 8:1 to 12:1, and most preferably about 10:1. The built-in microstructure parts are preferably configured in such a way that the flow velocity of the fluid stream at the outlet into the mixing zone is greater than at the inlet into the linking channel and preferably also greater than the flow velocity of the mixture through the mixing zone.

The linking channels and part channels disposed on the disks can be provided in free form. The disks as well as each individual channel disposed thereon can vary in height, width and thickness so they are also able to convey different media and different quantities. The basic shape of the disks can be of any desired kind, for example it can be round or circular or else elliptical or angular, for example rectangular or square. The shape of the disk can also be optimized in terms of simple fabrication or in terms of minimum weight or minimum unused surface. The outlets of the part channels can be arranged in any desired manner from a straight line to any geometric form. For example, the outlet openings can be arranged on a circular line, particularly when the mixing zone is completely enclosed by the plane of the disk. Two or more than two constituents (A, B, C etc) can be conveyed in a disk and mixed in identical or different quantitative ratios. The part channels can be disposed at any angle to each other or relative to the line on which the outlets into the mixing zone are disposed. Several part channels, each conveying, for example, constituent A, can be arranged side by side, and in the adjacent section of the same disk there can be arranged side by side several part channels conveying, for example, constituent B. By means of additional through-holes and additional part channels in the disks, hiwever, the components can be configured so that constituents A, B etc alternate from part channel to part channel in the same disk.

At their entrance into the mixing zone, the part channels preferably have a width in the range from 1 μm to 2 mm and a depth in the range from 10 μm to 10 mm and most preferably a width in the range from 5 μm to 250 μm and a depth in the range from 250 μm to 5 mm.

The linking channel can have a variable width. Preferably, the ratio of the greatest width of the linking channel and/or the width of the inlet opening to the width of the part channels at their outlet into the mixing zone is greater than 2 and preferably greater than 5. The ratio of the width of the mixing zone to the width of the part channels is preferably greater than 2 and most preferably greater than 5.

The disk-shaped components can be from 10 to 1000 μm thick. The height of the channels is preferably less than 1000 μm and most preferably less than 250 μm. The wall thickness of the built-in microstructure parts and of the channel bottom is preferably less than 100 μm and most preferably less than 70 μm.

In a particular embodiment, at least one of the inlet or outlet openings or the mixing zone is completely enclosed by the plane of the disk. In this case, the openings are in the form of, for example, round or angular, for example rectangular, recesses. In the case of an enclosed mixing zone, the elliptic or circular shape is preferred. The part channels can taper off in the form of nozzles in the direction of the mixing zone. The part channels can be linear or bent in the shape of a spiral. The part channels can enter into the mixing zone at a right angle relative to the circumferential line of the mixing zone or at an angle different from 90°. When, in the event that the angle is different from a right angle, a stack of several mixing disks is formed, the disks with opposite deviation from a right angle are adjacent to each other. Similarly, in the event that the course of the part channels is spiral-shaped, when a stack is formed from several mixing disks, the disks with oppositely oriented direction of spiral rotation are preferably adjacent to each other.

When the part channels are bent, it is also advantageous that the inflows into the mixing zone have the same rotational direction and that within the mixing stream a strong spin is formed resulting in a centrifugal effect. The heavier of the liquid constituents will preferably stay at the outer edge of the mixing zone and the lighter constituent in the middle of the mixing stream. As a result, when the material to be extracted is in the heavier phase, very thorough mixing will take place with the lighter phase flowing from the microchannels that form the walls of the main channel. In this manner, the theoretical number of plates for an extraction can be increased, Such a static centrifugal extractor offers the advantages of a rotational extractor without depending on the expensive and failure-prone mechanical system of the latter.

The linking channel between the openings is preferably formed by an indentation. The inlet opening and/or outlet opening or the mixing zone, however, can also be disposed at the edge of the disk or be in the form of recesses at the edge of the disk.

In another particular embodiment, there are present at least two inlet openings for at least two different fluid streams, each inlet opening being connected with the mixing zone through a linking channel. In this case, there are preferably two outlet openings for two different fluids on opposite sides of the mixing zone, the mixing zone preferably being in a position completely enclosed within the disk plane.

Suitable materials of construction for the components are, for example, metals, particularly corrosion-resistant metals, such as, for example, stainless steel, as well as glasses, ceramic materials or plastic materials. The components can be fabricated by techniques for producing microstructures on surfaces, techniques that in and of themselves are known, for example by etching or milling of metals or by embossing or injection-molding of plastics The static micromixer of the invention has a housing with at least 2 inlets for fluids and at least one outlet for fluids. The housing contains a disk-shaped micromixer component or it contains at least two such components arranged in a stack. Stacks can be formed from any number of disks permitting a flow-through commensurate with the height of the stack. To ensure the same pres-sure throughout the mixer, in the case of greater lengths the fluid can be introduced at several points. Grooves or ribs can be used for the purpose of stacking and aligning. The disks are su-perposed on one another so that the inlet openings form subsidiary channels for introducing a particular carrier fluid or extraction fluid and the outlet openings or the mixing zone together form a main channel for removing the fluid mixture, the main channels and subsidiary channels extend-ing through the stack. When the inlet openings are disposed as recesses at the edge of the disk, the housing wall can form the outwardly terminating part of the wall of a subsidiary chan-nel. When the mixing zone is disposed as a recess at the edge of the disk, the housing wall can form the outwardly terminating part of the wall of the main channel. Overall, a micromixer can have, for example, at least 5, 10, 100 or even more than 1000 part channels and consist of a stack of disks each having several part channels.

Preferably, each part stream of a first fluid A flowing from an outlet opening of a disk into the mixing zone is directly adjacent to a part stream of a second fluid B flowing from an outlet opening of an adjacent disk into the mixing zone. In the mixing zone, the mixing takes place by diffusion and/or turbulence, mixing taking place at least in part or entirely by turbulence being preferred.

In another embodiment of the micromixer, the linking channels of the disks are formed by indentations. Before they end in the mixing zone, the linking channels are divided into part channels by microstructure units disposed on the disks. In an alternative embodiment, the linking channels of the disks are formed as recesses in the disks, the disks being arranged as intermediate disks between a cover disk and a bottom disk, and the linking channels before opening into the mixing zone being divided into part channels by microstructure units disposed on the cover disk and/or bottom disk. Heat-supplying or heat-removing heat exchangers can be integrated into the micromixer of the invention. In this manner, on the basis of the temperature dependence of the distribution coefficients the separation performance can be further optimized and by cooling it is possible to carry out low-temperature extractions of heat-sensitive substances.

In the extraction process of the invention, the flow velocity of the fluid stream or fluid streams into the mixing zone is preferably greater than the flow velocity of the mixture within the mixing zone. Particularly preferred are configurations of the micromixer and flow velocities that cause turbulence in the mixing zone so that the mixing in the mixing zone takes place entirely or at least in part by turbulence.

The two fluid phases can be introduced either through different subsidiary channels or one phase (preferably the continuous phase) is introduced through the main channel and the second phase (preferably the phase to be dispersed) is introduced through a subsidiary channel.

To increase the capacity of the process of the invention, the number of channels in the disks can be increased or the number of the disks superposed on one another in a micromixer can be increased or several micromixers can be connected in parallel and operated as a module. It is also possible to use two or more micromixers in series, one after another, particularly to improve the separation efficiency. In this case, for the purpose of separating the immiscible phases, the settlers can either be integrated into the micromixers and/or they can follow the micromixers as separate units.

In the following, exemplary embodiments of components and micromixers that are suitable according to the invention will be explained by reference to drawings.

BREIF DESCRIPTION OF THE DRAWINGS

Figure 1B:
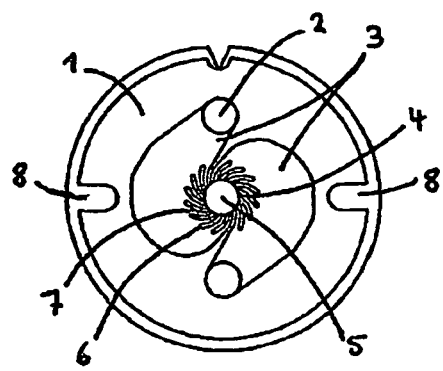
Figure 1C:
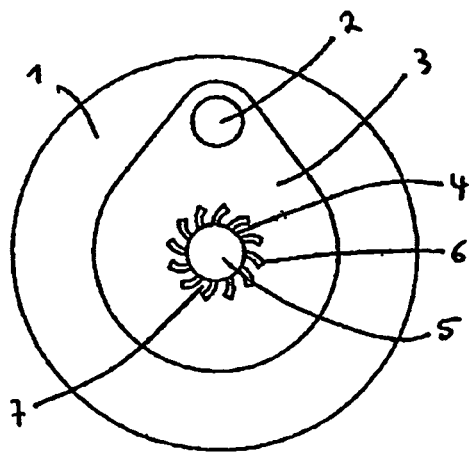
Figure 1D:
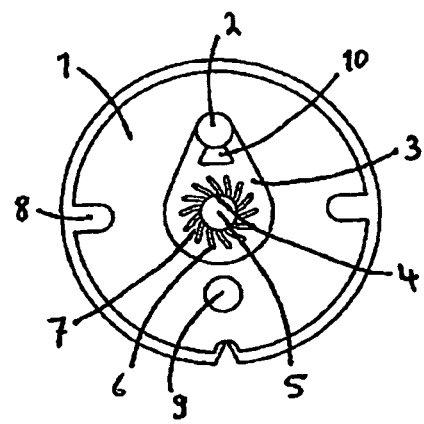
Figure 2A:
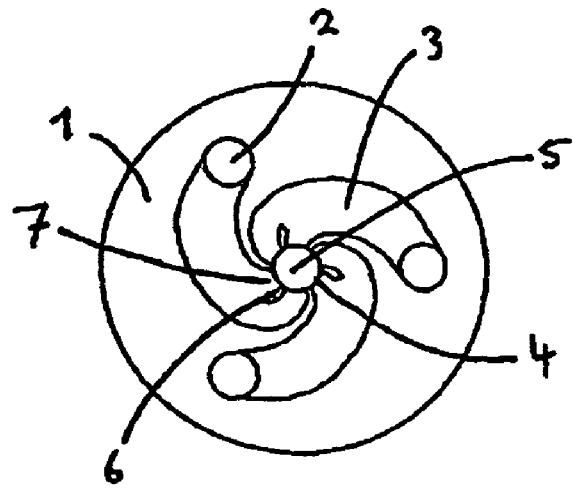
Figure 2B:
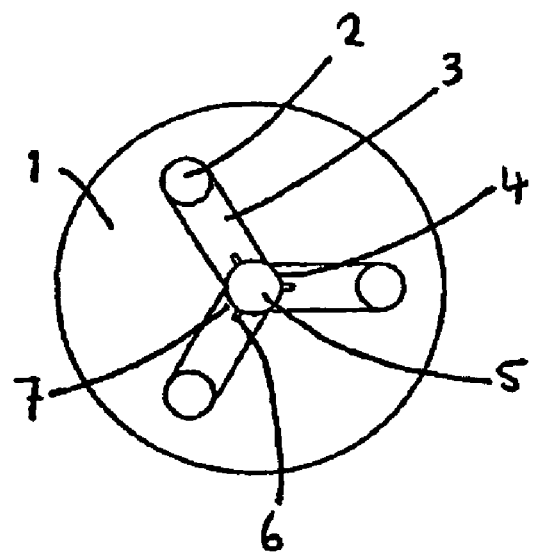
Figure 2C:
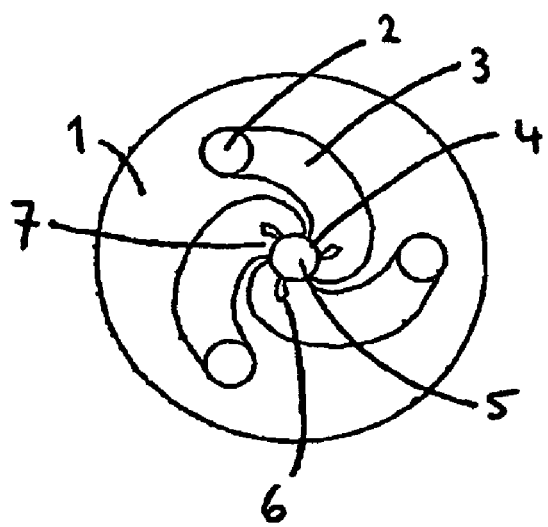
Figures 3A, 3B:
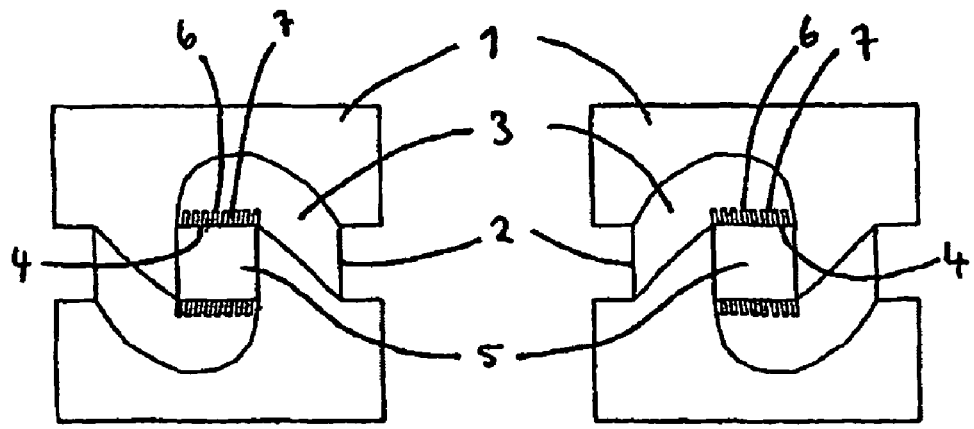
Figures 3C, 3D:
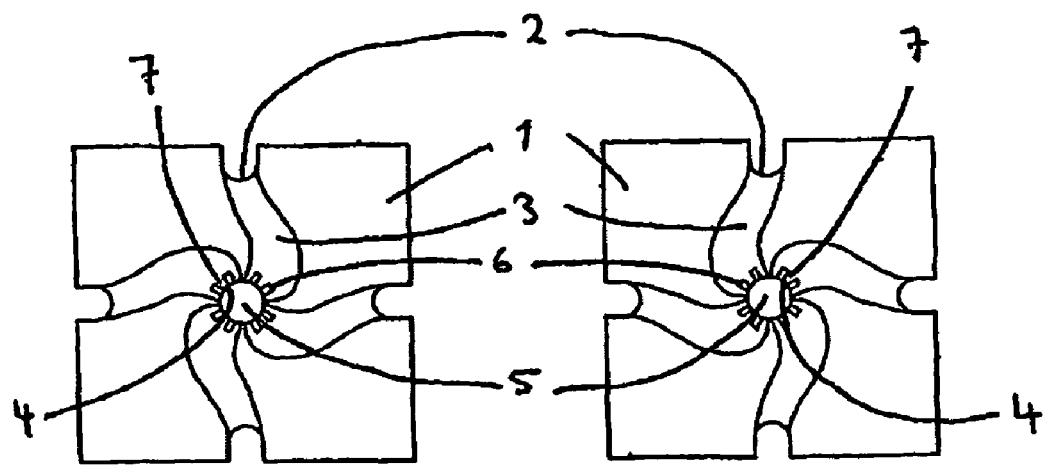
Figures 4A, 4B:
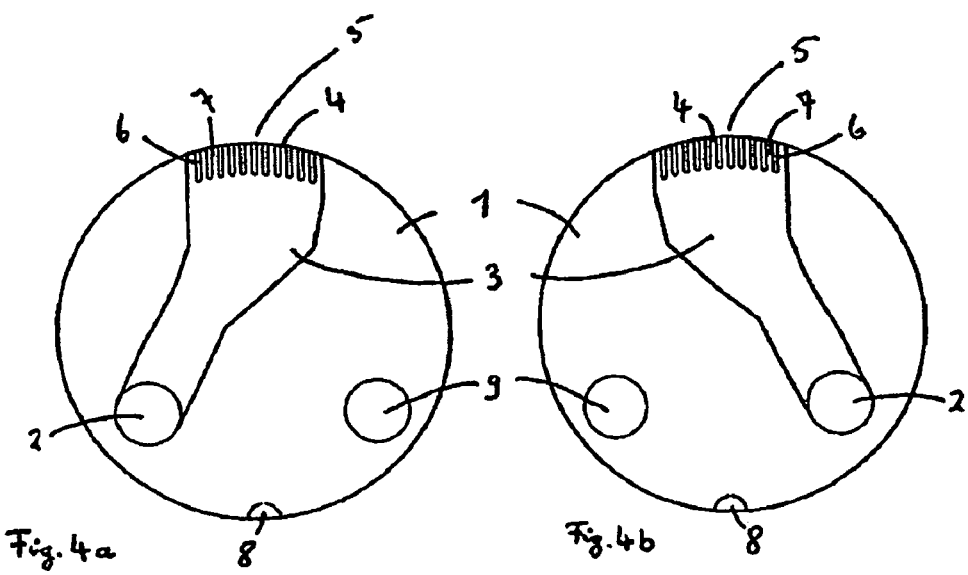
Figures 4C, 4D:
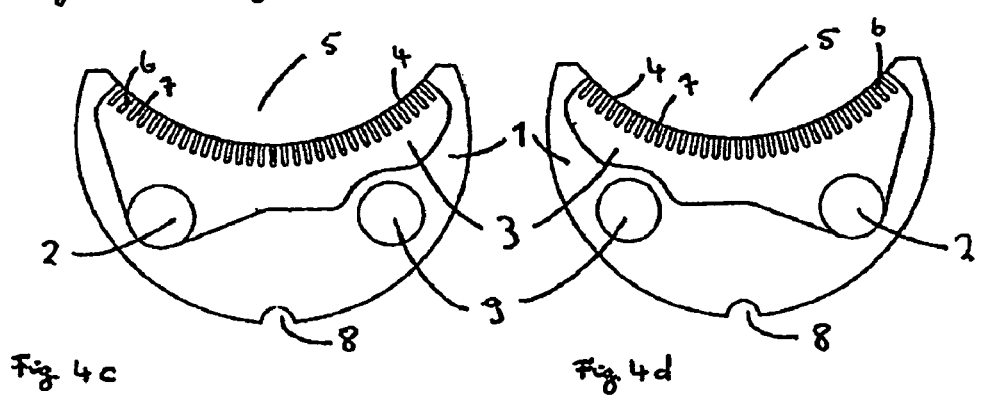
Figures 4E, 4F:
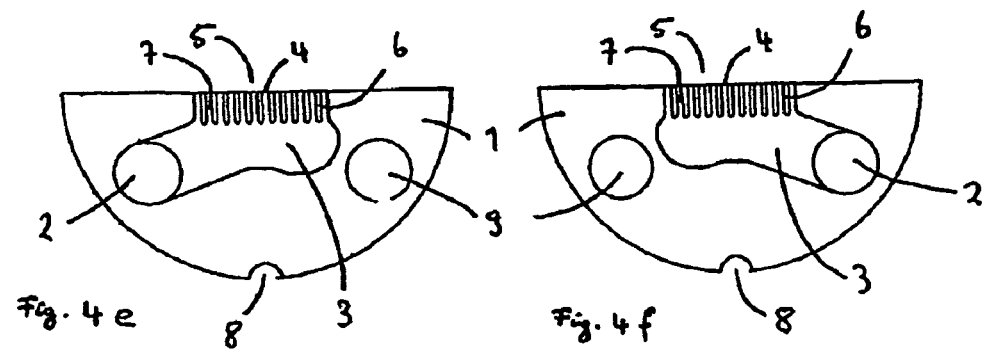
Figure 5A:
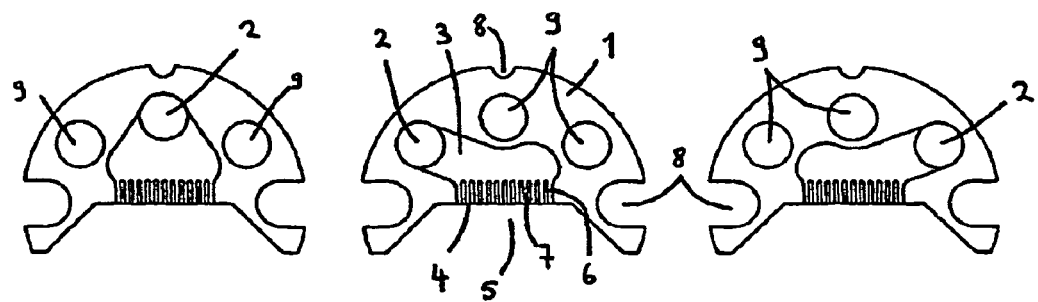
Figure 5B:
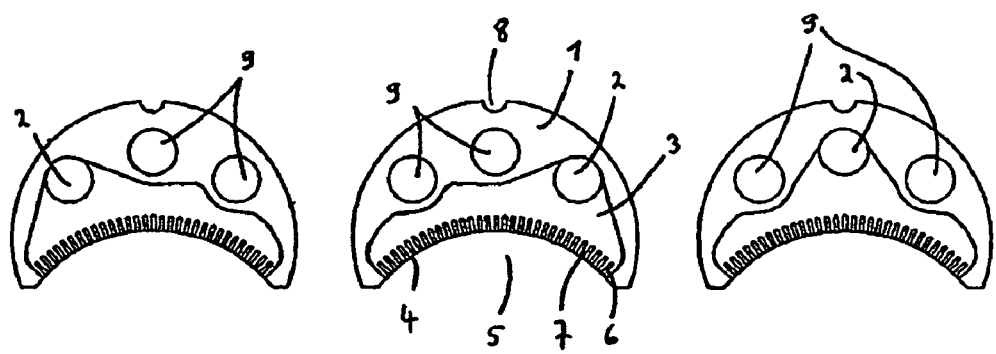
Figure 6A:
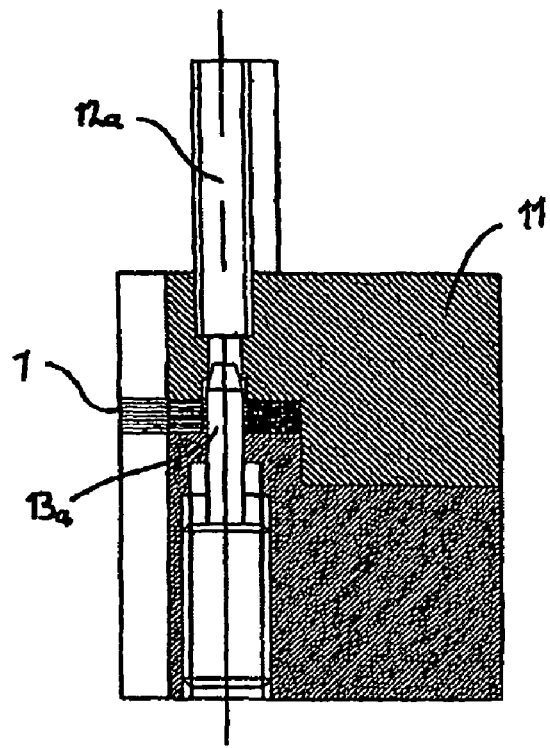
Figure 6B:
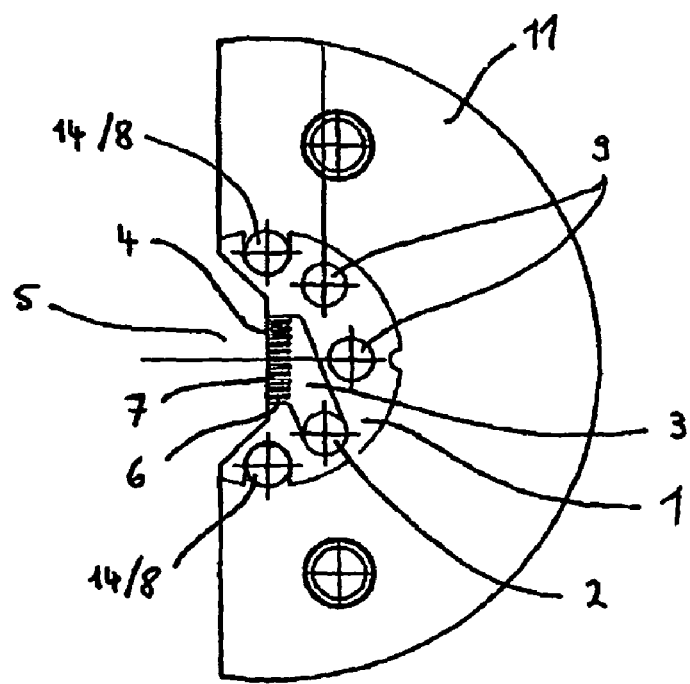
Figure 7A:
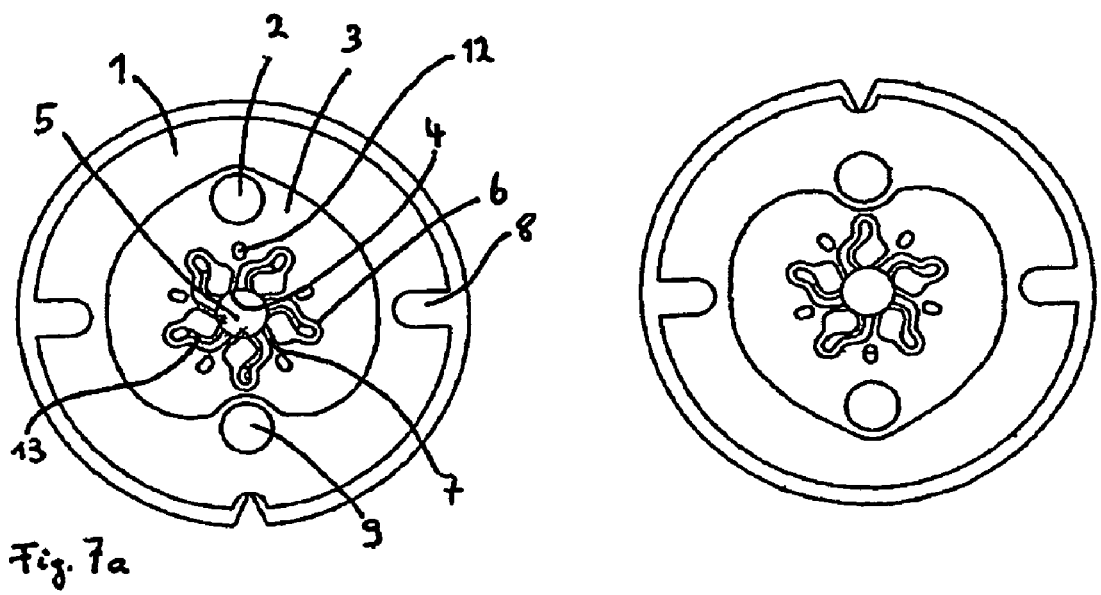
Figure 7B:
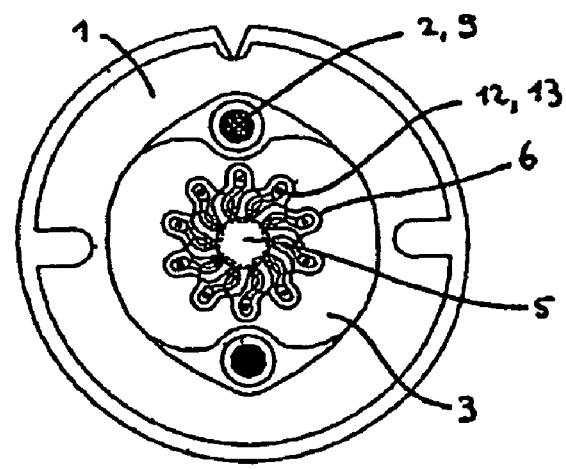
Figure 8A:
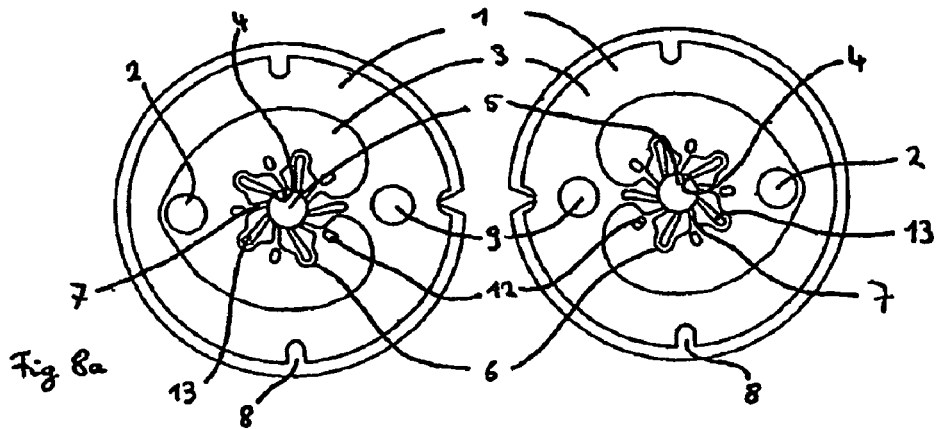
Figure 8B:
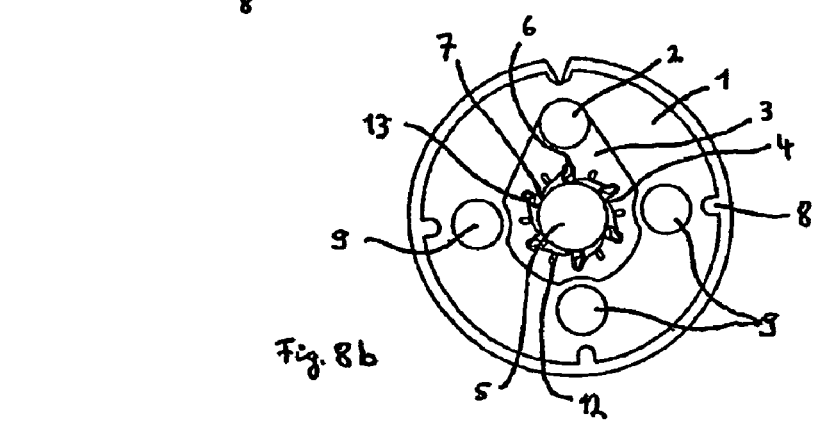
Figure 9:
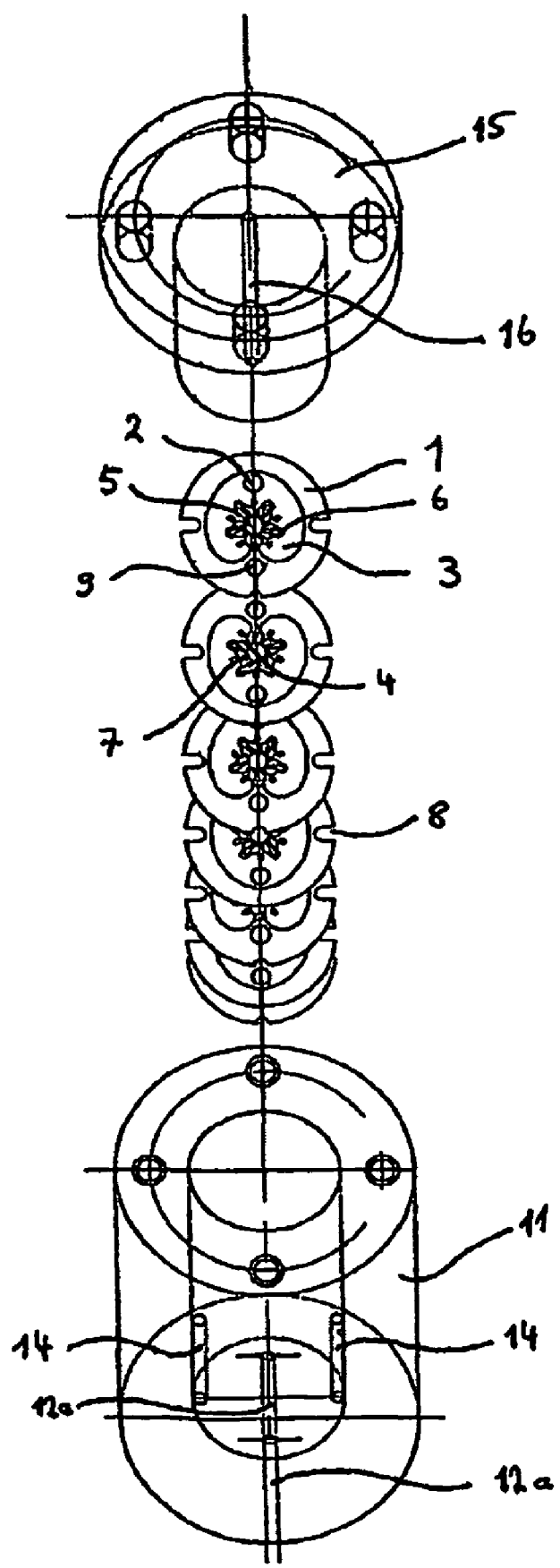

FIG. 1a-b shows mixing disks with two inlet openings for two fluid streams and wherein the inlet opening and outlet opening are enclosed, FIG. 1c shows a mixing disk with a single inlet opening and wherein the inlet openings and outlet openings are enclosed, FIG. 1d shows a mixing disk wherein the inlet opening, flow-through opening and outlet opening are enclosed, FIG. 2a-c shows mixing disks with three inlet openings for up to three equal or different fluid streams and wherein the inlet openings and outlet openings are enclosed, FIG. 3a-b shows mixing disks with two inlet openings at the edge of the disk for two fluid streams and with an enclosed outlet opening, FIG. 3c-d shows mixing disks with four inlet openings at the edge of the disk for up to four equal or different fluid streams and with an enclosed outlet opening, FIG. 4a-f shows mixing disks each with an enclosed inlet opening and enclosed flow-through opening for two fluid streams and an outlet opening at the edge of the disk, FIG. 5a-b shows mixing disks each with one enclosed inlet opening and two enclosed flow-through openings for up to three different fluid streams and an outlet opening at the edge of the disk, FIG. 6a shows a longitudinal section of the schematic structure of a static micromixer, FIG. 6b shows a mixing disk in an open housing, FIG. 7a-b shows mixing disks with enclosed inlet openings and flow-through opening and additional part channels, wherein different fluid streams can flow through adjacent part channels, FIG. 8a,c shows mixing disks with enclosed inlet and flow-through openings and additional part channels, wherein different fluids can flow through adjacent part channels, FIG. 8b shows a mixing disk with an enclosed inlet opening, three enclosed flow-through openings and additional part channels, wherein different fluids can flow through adjacent part channels, and FIG. 9 shows a micromixer with a housing and a stack of several mixing disks.

DETAILED DESRCIPTION OF THE INVENTION

One embodiment is shown in FIG. 1a and FIG. 1b. The disks (1) each have two enclosed inlet openings (2). Each inlet opening (2) is connected with one linking channel (3) formed by an indentation in the plane of the disk. By a multiplicity of microstructure units (6), each linking channel (3) is divided into a multiplicity of part channels (7). Through the outlet openings (4), the part channels (7) open into an enclosed mixing zone (5). The outlet openings (4) are arranged on a circular line around the mixing zone (5). The mixing zone (5) and the inlet openings (2) are formed as through-holes in the disks. The microstructure units are bent, for example, in the form of spirals, the spirals in FIG. 1a and FIG. 1b having an opposite sense of rotation. The microstructures units, however, can also be linear or unbent. When the disks are round, they preferably have recesses (8) at the edge which can cooperate with fixing elements (14) in a housing (11) to prevent twisting or slipping of the disks. The disks, however, can also be angular, preferably quadrangular, for example in the shape of a square. In this case, the recesses and fixing elements may be omitted. Through the two inlet openings (2) two different fluid streams can be introduced into the mixing zone (5) in one plane, the two outlet openings corresponding to the two different fluid streams preferably being disposed opposite each other. A micromixer preferably has a stack of several components superposed on one another, with disks of the kind shown in FIG. 1a alternating with disks of the kind shown in FIG. 1b and giving rise to an arrangement consisting of an alternating layer structure ABAB etc. In this manner, two different fluid streams can be fed to the mixing zone (5) directly adjacent and over and under one another. In the stack, the disks are superposed on one another in such a way that the inlet openings form subsidiary channels for introducing a particular fluid stream, and the mixing zones form a main channel for removing the mixture. A fluid that later will constitute the continuous phase of the mixture, however, can also be introduced through the main channel.

Another embodiment is shown in FIG. 1c. The disk (1) has a single enclosed inlet opening (2) which is connected with a linking channel (3) formed by an indentation in the disk plane. The linking channel (3) is divided by a multiplicity of microstructure units (6) into a multiplicity of part channels (7). The part channels (7) open through the outlet openings (4) into the mixing zone (5). The outlet openings (4) are arranged on a circular line around the mixing zone (5). The mixing zone (5) and the inlet opening (2) are configured as through-holes in the disk. The microstructure units are bent, for example, in the shape of a spiral. The microstructure units, however, can also be linear, unbent or have any other geometric shape. A micromixer preferably has a stack of several components superposed on one another. In the stack, the disks are disposed above one another in a manner such that the inlet openings form a subsidiary channel for introducing a fluid stream, and the mixing zones form a main channel for removing the mixture. Through the main channel can be introduced one of the constituents to be mixed, preferably the fluid which later will form the continuous phase of the mixture. This embodiment is particularly well suited, for example, for gas/liquid extraction. To this end, the liquid phase is introduced through the central main channel and the gas phase is introduced through the subsidiary channel. Advantageously, the stack of disks can be configured as an alternating layer structure wherein disks with spiral-shaped microstructure units (6) of opposite sense of rotation are alternately disposed one above the other. It is also possible to use only a single type of disk. The microstructure units are then preferably linear and shaped so that the part channels form nozzles.

Another embodiment is shown in FIG. 1d. The disk (1) has an enclosed inlet opening (2), an enclosed mixing zone (5) and an enclosed flow-through opening (9). The inlet opening (2) is connected with a linking channel (3) formed by an indentation in the disk plane, which channel by a multiplicity of microstructure units (6) is divided into a multiplicity of part channels (7). The part channels (7) open through the outlet openings (4) into the mixing zone (5). The outlet openings (4) are arranged on a circular line around the mixing zone (5). The mixing zone (5), inlet opening (2) and flow-through opening (9) are configured as through-holes in the disk. The microstructure units are, for example, bent in the form of spirals. The microstructures units, however, can also be linear, unbent or have any other geometric shape. With additional built-in components (10) in the linking channel, the flow conditions in the linking channel (3) can be optimized.

When the disks are round, they preferably have at their edges recesses (8) that can cooperate with fixing elements (14) in a housing (11) to prevent twisting or slipping of the disks. A micromixer preferably has a stack of components wherein several disks of the kind shown in FIG. 1d are disposed above one another and alternately twisted by 180°. In this manner, two different fluid streams can be introduced into the mixing zone (5) directly adjacent and above and under one another. In the stack, the disks are superposed on one another in a manner such that the inlet openings (2) and the flow-through openings (9) alternate forming two subsidiary channels for introducing two fluid streams, and the mixing zones form a main channel for removing the mixture. A fluid that later will constitute the continuous phase of the mixture, however, can also be introduced through the main channel. Advantageously, the stack of disks can have a configuration with an alternating layer structure wherein disks with spiral-shaped micro-structure units (6) of opposite sense of rotation are disposed alternately one above the other. A single type of disk, however, can also be used. The microstructure units are then preferably linear and configured in such a way that the part channels form nozzles.

FIGS. 2a to 2c show another embodiment. Each of the disks (1) has three enclosed inlet openings (2). Each inlet opening (2) is connected with a linking channel (3) formed by an indentation in the plane of the disk. Each linking channel (3) is divided by at least one microstructure unit (6) into at least two part channels (7). By means of a larger number of microstructure units, division into a higher number of part channels can be achieved. Through the outlet openings (4), the part channels (7) open into the mixing zone (5). The outlet openings (4) are arranged on a circular line around the mixing zone (5). The mixing zone (5) and the inlet openings (2) are configured as through-holes in the disks. The microstructure units can be in the form of spirals having a different sense of rotation or they can be linear. Through the three inlet openings (2), equal fluid streams or up to three different fluid streams can be introduced into the mixing zone (5) in one plane. A micromixer preferably has a stack of several components disposed above one another wherein different types of disks as shown in FIGS. 2a, 2b and 2c alternate forming an alternating layer structure, for example ABCABC. In this manner, two different fluid streams can be introduced into the mixing zone (5) directly adjacent and over and under one another. In the stack, the disks are disposed above one another so that the inlet openings form subsidiary channels for introducing a particular fluid stream, and the mixing zones form a main channel for removing the mixture. A fluid that later will constitute the continuous phase of the mixture, however, can also be introduced through the main channel.

Another embodiment is shown in FIG. 3a and FIG. 3b. The disks (1) have two inlet openings (2) positioned at the edge of the disk. Each inlet opening (2) is connected with a linking channel (3) formed by an indentation in the plane of the disk. Each linking channel (3) is divided by a multiplicity of microstructure units (6) into a multiplicity of part channels (7). Through the outlet openings (4), the part channels (7) open into an enclosed mixing zone (5). The outlet openings (4) are arranged on a straight line. The mixing zone (5) is configured, for example, as a rectangular through-hole in the disks. The microstructure units are disposed, for example, at an angle to the direction of flow, the inclinations in FIGS. 1a and 1b. extending in opposite directions. The micro-structure units, however, can also have the same inclination or no inclination at all. The disks have an approximately quadrangular basic shape, but they can also have any other basic geometric shape (angular, round, elliptical etc). Through the two inlet openings (2), two different fluid streams can be introduced into the mixing zone (5) in one plane, with the two outlet openings for the two different fluid streams preferably disposed opposite each other. A micro-mixer preferably has a stack of several components disposed above one another, the disks of the kind shown in FIG. 3a alternating with disks of the kind shown in FIG. 3b and forming an alternating layer structure ABAB. In this manner, two different fluid streams can be introduced into the mixing zone (5) directly adjacent and over and under one another. In the stack, the disks are disposed above one another so that the inlet openings together with the mixer housing form at the edge of the mixer subsidiary channels for introducing a particular fluid stream, and inside the mixer the mixing zones form a main channel for removing the mixture. A fluid that later will constitute the continuous phase of the mixture, however, can also be introduced through the main channel.

Another embodiment is shown in FIG. 3c and FIG. 3d. Each disk (1) has four inlet openings (2) positioned at the edge of the disk. Each inlet opening (2) is connected with a linking channel (3) formed by an indentation in the plane of the disk. Each linking channel (3) is divided by several microstructure units (6) into several part channels (7). Through the outlet openings (4), the part channels (7) open into an enclosed mixing zone (5). The outlet openings (4) are arranged on a circular line. The linking channels are bent into spiral shapes, the spirals in FIGS. 3c and 3d having an opposite sense of rotation. The mixing zone (5) is configured as a through-hole in the disks. The microstructure units are, for example, straight, but they can also be slanted or bent like a spiral. The disks have an approximately quadrangular basic shape, but they can also have any other basic geometric shape (angular, round, elliptical etc). Through the four inlet openings (2), equal fluid streams or up to four different fluid streams can be introduced into the mixing zone (5) in one plane, with the outlet openings for the different fluid streams preferably disposed opposite one another. A micromixer preferably has a stack of several components disposed above one another wherein disks of the kind shown in FIG. 3c alternate with disks of the kind shown in FIG. 3d and have a sense of rotation opposite to that of the spiral-shaped linking channels, thus forming an alternating layer structure ABAB. In this manner, two different fluid streams can be introduced into the mixing zone (5) directly adjacent and over and under one another. In the stack, the disks are disposed above one another so that the inlet openings together with the mixer housing form at the edge of the mixer subsidiary channels for introducing a particular fluid stream, and inside the mixer the mixing zones form a main channel for removing the mixture. A fluid that later will constitute the continuous phase of the mixture, however, can also be introduced through the main channel.

Additional embodiments are shown in FIG. 4a to FIG. 4f. Each disk (1) has an enclosed inlet opening (2) and an enclosed flow-through opening (9). Each inlet opening (2) is connected with a linking channel (3) formed by an indentation in the plane of the disk. By a multiplicity of microstructure units (6), each linking channel (3) is divided into a multiplicity of part channels (7). Through outlet openings (4) arranged at the edge of the disks, the part channels (7) open into the mixing zone (5) disposed outside the plane of the disk. The outlet openings (4) can be arranged on straight lines (FIG. 4e, 4f) or on arc segments, the arc segments being convex (FIG. 4a, 4b) or concave (FIG. 4c, 4d). The inlet openings (2) and the flow-through openings (9) are configured as through-holes in the disks. The microstructure units can be parallel or they can be disposed at various angles to the flow direction preset by the linking channel. When the disks are round, they preferably have at their edge recesses (8) which can cooperate with fixing elements (14) in a housing (11) to prevent twisting or slipping of the disks. A micromixer preferably has a stack of several components disposed above one another wherein the disks of the kind shown in FIG. 4a alternate with disks of the kind shown in FIG. 4b, or disks of the kind shown in FIG. 4c alternate with disks of the kind shown in FIG. 4d, or disks of the kind shown in FIG. 4e alternating with disks of the kind shown in FIG. 4f, giving rise to an alternating layer structure ABAB. In this manner, two different fluid streams can be fed to the mixing zone (5) directly adjacent and over and under one another. Preferably, the angles at which the part channels open into the mixing zone are different relative to the circumferential line of the mixing zone in adjacent disks and most preferably have opposite deviations of 90°. In the stack, the disks are disposed over one another in a manner such that the inlet openings (2) and the flow-through openings (9) alternate and inside the mixer form subsidiary channels for introducing two fluid streams. The mixing zone and a housing can form a main channel for removing the mixture.

Other embodiments are shown in FIG. 5a and FIG. 5b. Each of the disks (1) has an enclosed inlet opening (2) and two enclosed flow-through openings (9). Each inlet opening (2) is connected with a linking channel (3) formed by an indentation in the plane of the disk. By a multiplicity of microstructure units (6), each linking channel (3) is divided into a multiplicity of part channels (7). Through outlet openings (4) arranged at the edge of the disks, the part channels (7) open into the mixing zone (5) disposed outside the plane of the disk. The outlet openings (4) can be arranged on straight lines (FIG. 5a) or on arc segments (FIG. 5b), the arc segments being convex or concave. The inlet openings (2) and the flow-through openings (9) are configured as through-holes in the disks. The microstructure units can be parallel or they can be disposed at various angles to the flow direction preset by the linking channel. When the disks are round, they preferably form at their edge recesses (8) which can cooperate with fixing elements (14) in a housing (11) to prevent twisting or slipping of the disks. A micromixer preferably has a stack of several components disposed above one another, the disks of the three different kinds shown in FIG. 5a alternating with those of the kind shown in FIG. 5b giving rise to an alternating layer structure ABCABC. In this manner, two different fluid streams can be fed to the mixing zone (5) directly adjacent and over and under one another. Preferably, the angles at which the part channels open into the mixing zone differ relative to the circumferential line of the mixing zone in adjacent disks, opposite deviations of 90° being particularly preferred. In the stack, the disks (1) are disposed over one another in a manner such that the inlet openings (2) and the flow-through openings (9) alternate and inside the mixer form three subsidiary channels for introducing up to three different fluid streams. The mixing zone (5) and a housing can form a main channel for removing the mixture.

FIG. 6a shows the schematic structure of an embodiment of a static micromixer in longitudinal section. A housing (11) is provided with fluid inlets (12a). The housing (11) contains a stack of several mixing disks (1) of the invention. The inlet openings and/or flow-through openings of the disks can be closed and opened by means of a closure (13a) that is preferably displaceable perpendicular to the plane of the disk. With the closure, it is also possible to adjust the flow rate. The mixture can be removed from the mixing zone disposed within the housing through an appropriate fluid discharge opening.

FIG. 6b shows the cross-section of a static mixer. Into a housing (11) is built a mixing disk (1) held in position by means of recesses (8) and fixing elements (14). The mixing disk is, for example, of the kind shown in FIG. 5a.

Other, preferred embodiments are shown in FIGS. 7a-b and FIGS. 8a-c. In these embodiments, the disks (1) have adjacent part channels (7) and (13) through which different fluid streams can flow alternately so that different fluid streams can be introduced into the mixing zone (5) directly adjacent in one plane.

Each of the disks (1) shown in FIG. 7a has an enclosed inlet opening (2), an enclosed mixing zone (5) and an enclosed flow-through opening (9). The inlet opening (2) is connected with a linking channel (3) formed by an indentation in the plane of the disk, said linking channel being divided into a multiplicity of part channels (7) by a multiplicity of microstructure units (6). Through the outlet openings (4), the part channels (7) open into the mixing zone (5). The outlet openings (4) are arranged on a circular line around the mixing zone (5). The mixing zone (5), the inlet opening (2) and the flow-through opening (9) are configured as through-holes in the disk. Into the microstructure units (6) are integrated additional part channels (13) configured as indentations and which are shielded against the linking channel (3) and open into the mixing zone (5). The part channels (7) and the additional part channels (13) are alternately disposed adjacent to each other. The disks are provided with additional through-holes (12), the number of the through-holes (12) and the number of the additional part channels (13) being identical. The through-holes (12) are arranged so that when a disk (1) is placed on a second disk (1) twisted by 180° said through-holes are disposed above the additional part channels (13) of the disk that is positioned underneath. A fluid stream flowing through the inlet opening (2) into the linking channel (3) can flow through the through-holes (12) into an additional part channel (13) of a disk positioned underneath. The angle formed by the adjacent part channels (7) and (13) to one another and relative to the circumferential line of the mixing zone can be different. In FIG. 7a, the angles of the part channels (7) and of the additional part channels (13) relative to the circumferential line of the mixing zone (5) have opposite deviations of 90°. As a result, the outlet openings of each two part channels form a pair. In this manner, two different fluid streams can be introduced on top of each other. The part channels, however, can also run parallel, at right angles or inclined toward the mixing zone. FIG. 7a shows next to each other two identical disks (1) twisted by 180°. FIG. 7b shows schematically two superposed disks twisted by 180°. A micromixer preferably has a stack of several superposed components, wherein disks of the kind shown in FIG. 7a twisted by 180° are alternately superposed on one another. In this manner, two different fluid streams can be fed to the mixing zone (5) both directly adjacent and over and under one another and also directly adjacent and next to each other. In the stack, the disks are disposed above one another so that the inlet openings (2) and the flow-through openings (9) alternate and form two subsidiary channels for introducing two fluid streams, and the mixing zones form a main channel for removing the mixture. A fluid that later will constitute the continuous phase of the mixture, however, can also be introduced through the main channel. Moreover, the disks are disposed above one another so that each additional through-hole (12) of a disk is connected in a communicating manner with one corresponding additional part channel (13) of an adjacent disk.

FIG. 8a shows an embodiment similar to that of FIG. 7a the difference being that the part channels (7) and the additional part channels (13) lead to the mixing zone (5) in parallel and inclined at identical angles. In FIG. 8a, the disk on the left differs from the disk on the right in that the angle formed between the part channels (7) and (13) and the circumferential line of the mixing zone (5) has an opposite deviation of 90°. A micromixer preferably has a stack of several superposed components wherein the left and the right disks shown in FIG. 8a alternate giving rise to an alternating layer structure ABAB. In this manner, two different fluid streams can be introduced into the mixing zone (5) directly adjacent and over and under each other at opposite angles.

Figure 8C:
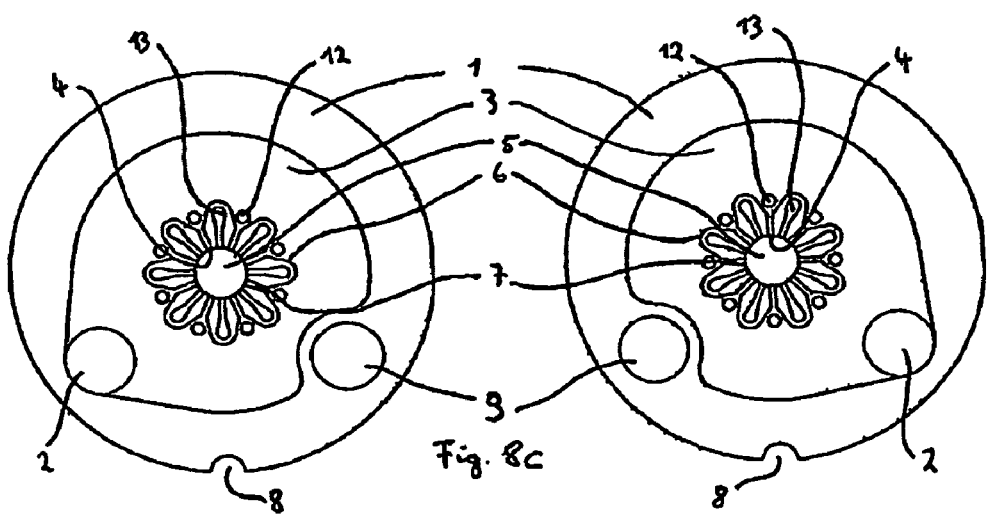

FIG. 8c shows an embodiment similar to that of FIG. 8a the difference being that the part channels (7) and the additional part channels (13) lead to the mixing zone (5) in parallel and vertically. A micromixer preferably has a stack of several superposed components wherein the left and right disks of the kind shown in FIG. 8c alternate resulting in an alternating layer structure ABAB. In the stack, the disks are superposed on one another so that the inlet openings (2) and the flow-through openings (9) alternate and form two subsidiary channels for introducing two fluid streams, and the mixing zones form a main channel for removing the mixture. Moreover, the disks are superposed on one another so that each additional through-hole (12) of a disk is connected in a communicating manner with a corresponding additional part channel (13) of an adjacent disk. In this manner, two different fluid streams can be introduced into the mixing zone (5) both directly adjacent and over and under each other and directly adjacent and next to each other.

Another embodiment is shown in FIG. 8b. A disk (1) has an enclosed inlet opening (2), three enclosed flow-through openings (9) and an enclosed mixing zone (5). The inlet opening (2) is connected with a linking channel (3) formed by an indentation in the plane of the disk and which by a multiplicity of microstructure units (6) is divided into a multiplicity of part channels (7). Through the outlet openings (4), the part channels (7) open into the mixing zone (5). The outlet openings (4) are arranged on a circular line around the mixing zone (5). The mixing zone (5), the inlet opening (2) and the flow-through opening (9) are configured as through-holes in the disk. Into the microstructure units (6) are integrated in indented manner additional part channels (13) which are shielded against the linking channel (3) and which open into the mixing zone (5). The part channels (7) and the additional part channels (13) are disposed alternately adjacent to each other. The disks have additional through-holes (12), the number of the through-holes (12) and the number of the additional part channels (13) being identical. The through-holes (12) are arranged so that when a disk (1) twisted by 90° is placed on a second disk (1), the said through-holes are positioned above the additional part channels (13) of the disk located underneath. A fluid stream flowing through the inlet opening (2) into the linking channel (3) can flow through the through-holes (12) into the additional part channel (13) of a disk disposed underneath. The angle formed between the adjacent part channels (7) and (13) and the angle relative to the circumferential line of the mixing zone can be different. In FIG. 8b the angles of the part channels (7) compared to the angles of the additional part channels (13) relative to the circumferential line of the mixing zone (5) have an opposed deviation of 90°. As a result, the outlet openings of each two part channels form a pair. In this manner, two different fluid streams can be introduced on top of each other. The part channels, however, can also run parallel at a right angle or inclined toward the mixing zone. A micromixer preferably has a stack of several superposed components, the disks of the kind shown in FIG. 8b being disposed above one another and each being twisted in any order by 90°, 180° or 270°. In this manner, different fluid streams can be introduced into the mixing zone (5) either directly adjacent and over and under one another or directly adjacent and next to each other. Overall, up to four different fluids can be mixed by means of the micromixer. In the stack, the disks are superposed on one another so that the inlet openings (2) and the flow-through openings (9) alternate and form a total of four subsidiary channels for introducing up to four fluid streams, and the mixing zones form a main channel for removing the mixture. A fluid that later will constitute the continuous phase of the mixture, however, can also be introduced through the main channel. Moreover, the disks are superposed on one another so that each additional through-hole (12) of a disk is connected in a communicating manner with the corresponding additional part channel (13) of an adjacent disk.

In FIG. 9 is shown as an example, in an exploded view, a possible embodiment of a micromixer usable according to the invention. A housing (11) contains a stack of components of the invention in the form of disks (1). Shown as an example is a stack of several disks of the kind shown in FIG. 8a, but other disks of the invention can also be used, in which case optionally the shape of the housing, the number and position of the inlets and outlets of the fluid etc must be correspondingly adapted. The disks (1) are positioned so that the recesses (8) cooperate with the fixing elements (14) to prevent the twisting of the disks. The housing has two fluid inlets (12a) for introducing the fluid streams. The housing can be closed with a cover (15) which is provided with a fluid outlet (16).

In one embodiment, the extraction process of the invention can be carried out according to the countercurrent principle whereby the fluid phase with the lower density is introduced below the fluid phase with the higher density.

LIST OF REFERENCE NUMERALS 1 disk
2 inlet opening
3 linking channel
4 outlet opening
5 mixing zone
6 microstructure unit
7 part channel
8 recess
9 flow-through opening
10 built-in structures
11 housing
12 through-hole
12a fluid inlet
13 additional part channel
13a closure
14 fixing element
15 cover

The invention claimed is:

1. A process for extracting a substance from one of at least two immiscible fluid phases comprising the steps of:
   a) providing at least a first fluid and a second fluid that, after mixing, form at least two immiscible fluid phases, wherein the first fluid contains at least one substance that is extractable by the second fluid;
   b) mixing the first fluid and second fluid by means of at least one static micromixer; and
   c) allowing the at least two immiscible fluid layers to separate wherein:
   said at least one static micromixer comprises at least one component in the form of a disk (1);
   said disk (1) comprises a single mixing zone (5), at least one inlet opening (2) disposed in a plane of said disk for introduction of at least one feed stream into a linking channel (3) and with at least one outlet opening (4) disposed in the plane of said disk for outflow of the feed stream directly into said single mixing zone (5), said at least one inlet opening (2) being connected with said at least one outlet opening (4) in a communicating manner via said linking channel (3) which is disposed in the plane of said disk;
   said linking channel (3) is divided once into more than two part channels (7) by microstructure parts (6) immediately prior to opening into the mixing zone (5), and each of the part channels (7) has a respective width in a millimeter to sub-millimeter range and said width is smaller than a width of the mixing zone (5); and
   said microstructure parts (6) are in direct contact with said mixing zone but not in direct contact with said at least one inlet opening (2).

2. The process as defined in claim 1, wherein the micromixer comprises a housing (11) at least 2 fluid inlets (12a), and at least one fluid outlet (16), and the housing (11) contains two or more of said at least one component in the form of a disk (1) arranged into a stack.

3. The process as defined in claim 2, wherein a plurality of disks (1) are superposed on one another so that the inlet openings (2) form subsidiary channels for introducing the liquid phase that is to be mixed, the mixing zones (5) together form a main channel for removing the mixed phase and the main channel and subsidiary channels extend through the stack.

4. The process as defined in claim 3, wherein an extraction agent is introduced into and conveyed through the main channel and the first fluid containing the substance to be extracted is conveyed through at least one subsidiary channel of the micromixer.

5. The process as defined in claim 1, wherein, at the outlet into the mixing zone (5), the widths of the part channels (7) of the disks (1) are from 1 μm to 2 mm.

6. The process as defined in claim 1, wherein the ratio of the greatest width of the linking channel (3) and/or the width of the inlet opening (2) to the width of the part channels (7) of the at least one disk (1) is greater than 2.

7. The process as defined in claim 1, wherein the ratio of the length to the width of the part channels (7) of the at least one disk (1) is from 1:1 to 20:1.

8. The process as defined in claim 1, wherein the ratio of the width of the mixing zone (5) to the width of the part channels (7) of the at least one disk (1) is greater than 2.

9. The process as defined in claim 1, wherein the at least one disk (1) is additionally provided with at least one flow-through opening (9).

10. The process as defined in claim 1 wherein at least one of the inlet openings (2) or flow-through openings (9) or the mixing zone (5) of the at least one disk (1) is enclosed by the plane of the disk and the linking channel (3) is formed by an indentation.

11. The process as defined in claim 1, wherein at least one of the inlet openings (2) or flow-through openings (9) or the mixing zone (5) of the at least one disk (1) is disposed at the edge of the disk or as a recess at the edge of the disk.

12. The process as defined in claim 1, wherein the at least one disk (1) is provided with at least two inlet openings (2) for at least two different fluid streams and each inlet opening (2) is connected with the mixing zone (5) through a linking channel (3).

13. The process as defined in claim 1, wherein the at least one disk (1) is provided with two inlet openings (2) for two different fluid streams, each inlet opening (2) being connected with the mixing zone (5) through a linking channel (3), and the outlet openings (4) of the two linking channels (3) are disposed opposite one another.

14. The process as defined in claim 1, wherein the outlet openings (4) of the at least one disk (1) are arranged on a circular line.

15. The process as defined in claim 1, wherein the at least one disk (1) is provided with additional through-holes (12) and additional part channels (13) that are integrated into the microstructure parts (6) and are separated from the part channels (7).

16. The process as defined in claim 3, wherein the linking channels (3) of the disks (1) are formed by indentations, and the linking channels (3) before opening into the mixing zone (5) are divided into part channels (7) by the microstructure parts (6) disposed on the disks (1).

17. The process as defined in claim 3, wherein the linking channels (3) of the disks (1) are formed by recesses in the disks (1), the disks being disposed as intermediate disks between a cover disk and a bottom disk, and the linking channels (3) before opening into the mixing zone (5) are divided into part channels (7) by microstructure parts (6) disposed on the cover disks and/or bottom disks.

18. The process as defined in claim 1, wherein the flow rate of the fluid stream into the mixing zone (5) is greater than the flow rate of the fluid mixture within the mixing zone.

19. The process as defined in claim 1, wherein the mixing in the mixing zone occurs at least in part by turbulence.

20. A process for extracting a substance from one of at least two immiscible fluid phases comprising the steps of:
  a) providing at least a first fluid and a second fluid that, after mixing, form at least two immiscible fluid phases, wherein the first fluid contains at least one substance that is extractable by the second fluid;
  b) mixing the first fluid and second fluid by means of at least one static micromixer; and
  c) allowing the at least two immiscible fluid layers to separate wherein:
  said at least one static micromixer comprises at least one component in the form of a disk (1);
  said disk (1) comprises a single mixing zone (5), at least one inlet opening (2) disposed in a plane of said disk for introduction of at least one feed stream into a linking channel (3) and with at least one outlet opening (4) disposed in the plane of said disk for outflow of the feed stream directly into said single mixing zone (5), said at least one inlet opening (2) being connected with said at least one outlet opening (4) in a communicating manner via said linking channel (3) which is disposed in the plane of said disk;
  said linking channel (3) is divided once into more than two part channels (7) by microstructure parts (6) immediately prior to opening into the mixing zone (5), and each of the part channels (7) has a respective width in a millimeter to sub-millimeter range and a length that is sufficient for flow control but which minimizes pressure for a given throughput and said width is smaller than a width of the mixing zone (5); and
  said microstructure parts (6) are not in direct contact with said at least one inlet opening (2).

21. The process as defined in claim 20, wherein a length-to-width ratio of each of the part channels (7) is 8:1 to 12:1 and a width of each of the part channels is from 5 μm to 250 μm.

22. A process for extracting a substance from one of at least two immiscible fluid phases, said process comprising the steps of:
  a) delivering a first feed stream of a first fluid from a first inlet opening (2) of a static micromixer through a first linking channel (3) to a first outlet opening (4) and directly into a mixing zone (5) of said micromixer, said first feed stream being divided only by microstructure parts (6) into part channels (7) immediately prior to entering said mixing zone (5);
  b) delivering a second feed stream of a second fluid to said mixing zone (5);
  c) mixing the first fluid stream with the second fluid stream in the mixing zone (5); and
  d) allowing the first and second fluids to separate wherein:
  said first fluid and said second fluid are immiscible and said substance is extracted from the first fluid into the second fluid or said substance is extracted from the second fluid into the first fluid;
  said static micromixer comprises at least one component in the form of a disk (1);
  said disk (1) comprises a single mixing zone (5);
  said first inlet opening (2), said first outlet opening (4), and said first linking channel (3) are disposed in the plane of said disk;
  each of the part channels (7) has a respective width in a millimeter to sub-millimeter range and said width is smaller than a width of the mixing zone (5); and
  said microstructure parts (6) are in direct contact with said mixing zone but not in direct contact with said at least one inlet opening (2).

23. The process as defined in claim 22, wherein said second feed stream is delivered from a second inlet opening (2) of said static micromixer through a second linking channel (3) to a second outlet opening (4) and directly into said mixing zone (5) of said micromixer, said second feed stream being divided only by microstructure parts (6) into part channels (7) immediately prior to entering said mixing zone (5); wherein:
  said static micromixer comprises at least one component in the form of a disk (1);
  said disk (1) comprises a single mixing zone (5);
  said second inlet opening (2), said second outlet opening (4), and said second linking channel (3) are disposed in the plane of said disk;
  each of the part channels (7) has a respective width in a millimeter to sub-millimeter range and said width is smaller than a width of the mixing zone (5); and
  said microstructure parts (6) are in direct contact with said mixing zone.

* * * * *